No. 840,927.  
PATENTED JAN. 8, 1907.
C. E. FUNK.  
VARIABLE SPEED GEAR.  
APPLICATION FILED MAY 4, 1906.
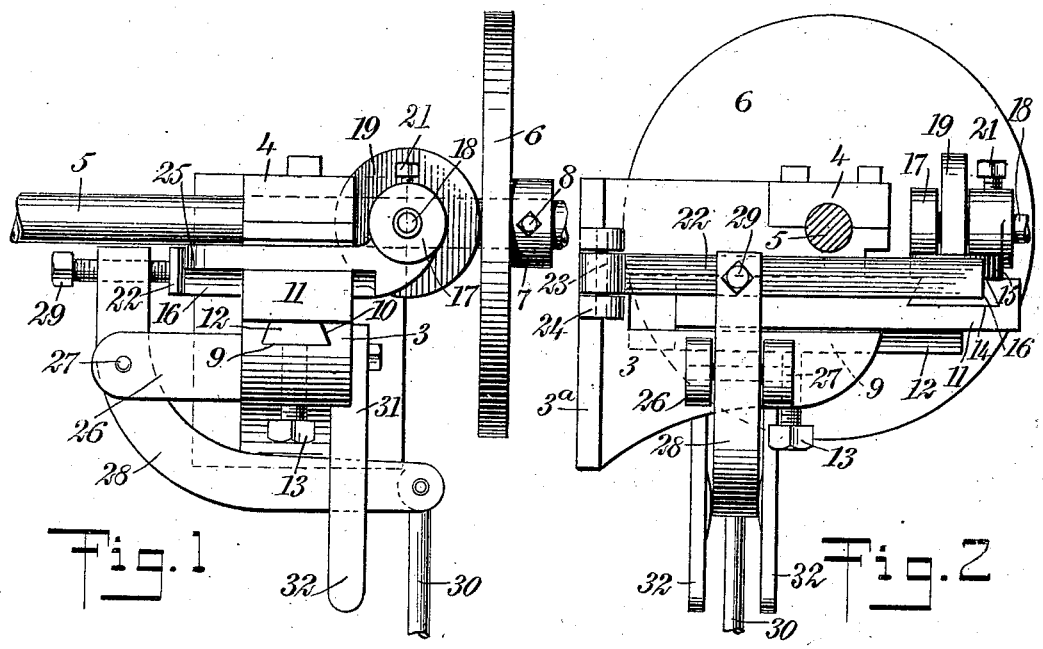
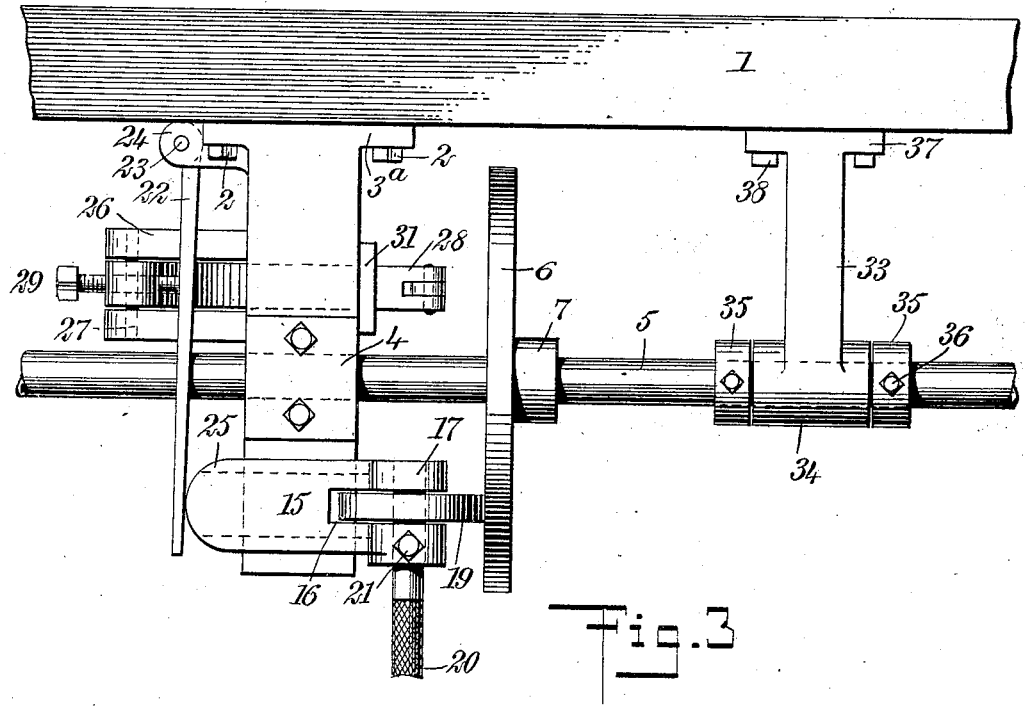
WITNESSES  
INVENTOR  
*Charles E. Funk*  
BY  
ATTORNEYS

UNITED STATES PATENT OFFICE.

CHARLES EDWARD FUNK, OF ENTERPRISE, OREGON.

VARIABLE-SPEED GEAR.

No. 840,927. Specification of Letters Patent. Patented Jan. 8, 1907.

Application filed May 4, 1906. Serial No. 315,167.

*To all whom it may concern:*

Be it known that I, CHARLES EDWARD FUNK, a citizen of the United States, and a resident of Enterprise, in the county of Wallowa and State of Oregon, have invented a new and Improved Variable-Speed Gear, of which the following is a full, clear, and exact description.

This invention relates to variable-speed gears, and is especially useful in connection with machines for shearing sheep and the like.

The object of the invention is to provide a transmission-gear, simple in construction and efficient in operation, which permits the speed of the operating parts to be varied within wide limits and which allows the mechanism to be stopped or started by a simple motion of the operator.

A further object of the invention is to provide a device of this class in which the transmission of the power is effected with a high degree of efficiency and without complication of parts.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1 is a front elevation of my invention. Fig. 2 is a side elevation, and Fig. 3 is a plan view.

I provide a body 3, which has flanges 3ª, by means of which it is attached to a support 1 by screws or bolts 2. The body 3 is provided with a bearing 4, in which is rotatably mounted a shaft 5, to which the power is applied by means of an engine, a horse-sweep, or other suitable means. Mounted upon the shaft 5 is a friction-disk 6, having a hub 7, in which is a set-screw 8, adapted to secure the disk to the shaft. The body 3 is also provided with a longitudinal groove 9, the axis of which lies in a plane parallel to the plane of the friction-disk 6. The groove 9 has upwardly-converging sides 10, thus forming a dovetail recess.

I provide a member 11, which has an extension 12 of substantially the same cross-section as the groove 9, in which it is slidably mounted. The body 3 has a set-screw 13, by means of which the member 11 may be secured thereto. This member 11 has a transverse groove 14 with upwardly-converging sides, in which is mounted a slide-bar 15, which has an extension 16 of similar cross-section to the groove 14. The slide-bar 15 is provided with a recess 16 and bearings 17, located on each side of this recess. Mounted in these bearings is a shaft 18, to which is attached a flexible shaft 20 by means of a set-screw 21. This flexible shaft serves to transmit power to the shearers or other devices. Rigidly mounted upon the shaft 18 is a friction-pulley 19, which is actuated by contact with a side face of the friction-disk 6.

A spring-bar 22 is pivotally mounted at one extremity by means of a pin 23 in suitable bearings 24 on the body 3. The spring-bar presses against the rounded end 25 of the slide-bar 15 to force the slide-bar and the friction-pulley 19, which it carries toward the friction-disk 6. Pivotally fulcrumed between the extension-bearings 26 of the body by means of a pin 27 is a right-angle lever 28. One arm of the lever 28 is provided with a set-screw 29, which abuts against the spring-bar 22. The other arm of the lever is provided with a rod 30, by means of which the operator may bear down upon it and force the opposite end against the spring-bar, and thus bring the friction-pulley 19 in contact with the friction-disk 6. The tension of the spring-bar may be increased or diminished by means of the set-screw 29. I provide a fork 31, having spring-tines 32, which are located one on each side of the lever 28 and by means of their tension are adapted to grip the same and hold it in a plurality of positions.

When it is desired to transmit power from the shaft 5 to the flexible shaft 20, the operator bears down upon the rod 30. This forces the set-screw 29 against the spring-bar 22, which in turn presses upon the slide-bar 15, and thus forces the friction-pulley 19 against the friction-disk 6. The lever 28 will be held in any desired position by the spring-fork 31. When it is desired to stop the mechanism, the rod 30 is pressed upward, releasing the tension of the spring-bar 22, and thus the pulley 19 is no longer held against the friction-disk 6.

When it is desired to alter the rate of the speed, the operator loosens the set-screw 13 and slides the member 11, carrying the slide-bar and the friction-pulley in a plane parallel to the face of the disk. It will be understood that the speed of the pulley relative to the speed of the disk will depend upon the point of contact of the pulley and the disk in a radial direction.

If necessary, an additional supporting-arm 33 may be provided, which terminates in a bearing 34 for the shaft 5. On each side of the bearing 34 are collars 35, having set-screws 36. The purpose of these collars is to prevent lateral movements of the shaft. The supporting-arm 33 has flanges 37, which are attached to the support 1 by means of screws or bolts 38.

Having thus described my invention, I claim as new, and desire to secure by Letters Patent, the following:

1. A device of the class described, comprising a friction-disk, a member adjustable in a plane substantially parallel to the plane of said disk and having a transverse groove substantially perpendicular to the plane of said disk, a slidable member in said groove and having a friction-pulley, and means for resiliently pressing said second member toward said disk.

2. In a device of the class described, a body, a shaft rotatably mounted thereon, a friction-disk rigidly mounted upon said shaft, said body having a groove substantially parallel to the plane of said disk, a member slidably mounted in said groove and having a transverse groove substantially perpendicular to the plane of said disk, a bar slidably located in said transverse groove, a friction-pulley rotatably mounted on said bar, and means for resiliently pressing said bar toward said friction-disk.

3. In a device of the class described, a body having a bearing, a shaft mounted in said bearing, a friction-disk rigidly mounted upon said shaft, said body having an extension provided with a groove the axis whereof is substantially parallel to the plane of said disk, a member having a transverse groove slidably mounted in said first groove, a slide-bar mounted in said transverse groove and having a friction-pulley, a spring-bar pivotally mounted on said body and adapted to press said slide-bar toward said disk, a lever adapted to press against said spring-bar, and means for holding said lever in a plurality of positions.

4. A device of the class described, comprising a body, a friction-disk, a member adjustable in a plane substantially parallel to the plane of said disk and having a transverse groove, means for holding said member in a plurality of positions, a slide-bar slidably mounted in said transverse groove, a friction-pulley thereon, a spring-bar adapted to press said slide-bar toward said disk, a lever adapted to press against said spring-bar, a set-screw in said lever adapted to adjust the tension of said spring-bar, and a spring-fork adapted to grip said lever and hold the same in a plurality of positions.

5. In a device of the class described, the combination with a friction-disk, a slidable member and a friction-pulley thereon, of a spring-bar adapted to press said member toward said disk, a lever adapted to place said spring-bar under tension, and a fork having spring-tines adapted to grip said lever and hold the same in a plurality of positions.

In testimony whereof I have signed my name to this specification in the presence of two subscribing witnesses.

CHARLES EDWARD FUNK.

Witnesses:
  THOS. M. DILL,
  DANIEL BOYD.